United States Patent
Sharif et al.

(10) Patent No.: US 11,210,397 B1
(45) Date of Patent: Dec. 28, 2021

(54) SYSTEMS AND METHODS FOR TRAINING MALWARE CLASSIFIERS

(71) Applicant: Symantec Corporation, Mountain View, CA (US)

(72) Inventors: Mahmood Sharif, Pittsburgh, PA (US); Saurabh Shintre, Sunnyvale, CA (US); Kevin Roundy, Culver City, CA (US); Sandeep Bhatkar, Sunnyvale, CA (US)

(73) Assignee: NortonLifeLock Inc., Tempe, AZ (US)

( * ) Notice: Subject to any disclaimer, the term of this patent is extended or adjusted under 35 U.S.C. 154(b) by 241 days.

(21) Appl. No.: 16/141,904

(22) Filed: Sep. 25, 2018

(51) Int. Cl.
*G06F 21/56* (2013.01)
*G06N 20/00* (2019.01)
*H04L 29/06* (2006.01)

(52) U.S. Cl.
CPC ........... *G06F 21/566* (2013.01); *G06N 20/00* (2019.01); *H04L 63/14* (2013.01); *H04L 63/145* (2013.01); *H04L 63/1416* (2013.01); *G06F 2221/034* (2013.01)

(58) Field of Classification Search
CPC .. G06F 21/566; G06F 2221/034; G06F 21/56; G06N 20/00; H04L 63/14; H04L 63/1416; H04L 63/145
See application file for complete search history.

(56) References Cited

U.S. PATENT DOCUMENTS

| 9,871,809 B2* | 1/2018 | Katz | H04L 63/1416 |
| 2018/0260705 A1* | 9/2018 | Puzis | G06Q 30/02 |
| 2019/0180029 A1* | 6/2019 | Copty | G06F 21/56 |

OTHER PUBLICATIONS

Rosenberg, Ishai, "Improvements in Obfuscation and Detection Techniques of Malicious Code", M.Sc. degree Thesis, Open University of Israel, Department of Mathematics and Computer Science, Nov. 2016 (Year: 2016).*
Pappas et al., "Smashing the gadgets: Hindering Return-Oriented Programming Using In-place Code Randomization", in Proceedings of the 2012 IEEE Symposium on Security and Privacy, accessed on May 23, 2012, 15 pages.
Krčál et al., "Deep Convolutional Malware Classifiers Can Learn from Raw Executables and Labels only", Workshop track—ICLR, Feb. 12, 2018, 8 pages.
Raff et al., "Malware Detection by Eating a Whole EXE", arXiv:1710.09435v1, Oct. 25, 2017, 13 pages.
Koo et al., "Juggling the Gadgets: Binary-level Code Randomization using Instruction Displacement", Proceedings of the 11th ACM on Asia Conference on Computer and Communications Security, May 30-Jun. 3, 2016, pp. 23-34.

* cited by examiner

*Primary Examiner* — Shanto Abedin
*Assistant Examiner* — Howard H. Louie
(74) *Attorney, Agent, or Firm* — FisherBroyles, LLP

(57) ABSTRACT

The disclosed computer-implemented method for training malware classifiers may include (1) perturbing, at a computing device, a binary file in a manner that maintains functionality of the binary file, (2) classifying the perturbed binary file with a first machine learning classifier to produce a classification result, (3) producing a transformed file by repeating the perturbing and classifying steps until the transformed file becomes misclassified, and (4) performing a security action comprising training a second machine learning classifier with the transformed file and an associated correct classification result. Various other methods, systems, and computer-readable media are also disclosed.

20 Claims, 6 Drawing Sheets

SYSTEMS AND METHODS FOR TRAINING MALWARE CLASSIFIERS

BACKGROUND

Conventional anti-malware systems may implement malware-detecting machine learning classifiers to identify malicious binary files. However, under some circumstances, some machine learning classifiers may be vulnerable to attacks that enable malware to escape detection by taking advantage of inherent vulnerabilities of the machine learning classifiers. The instant disclosure, therefore, identifies and addresses a need for systems and methods for training malware classifiers.

SUMMARY

As will be described in greater detail below, the instant disclosure describes various systems and methods for training malware classifiers.

In one example, a method for training malware classifiers may include (1) perturbing, at a computing device, a binary file in a manner that maintains functionality of the binary file, (2) classifying, at the computing device, the perturbed binary file with a first machine learning classifier to produce a classification result, (3) producing, at the computing device, a transformed file by repeating the perturbing and classifying steps until the transformed file becomes misclassified, and (4) performing, at the computing device, a security action comprising training a second machine learning classifier with the transformed file and an associated correct classification result.

In some examples, the method may further include (1) classifying a second binary file with the trained second machine learning classifier to produce a respective classification result for the second binary file and (2) performing a second security action in response to the respective classification result for the second binary file. In some embodiments, the second security action may include blocking access by second binary file to the computing device, another computing device, or both.

In an example, the binary file, prior to perturbing, may be benign or malicious. In an embodiment, perturbing may include: (1) iteratively changing functionally-equivalent instructions in the binary file during each repetition of perturbing and (2) retaining instruction changes that produce correct classification results having low decision confidence. In some examples, perturbing may include reordering instructions in the binary file. In some embodiments, perturbing may include removing an instruction from the binary file. In an example, perturbing may include changing an instruction in the binary file to a functionally-equivalent instruction.

In an embodiment, misclassification of the transformed file may indicate the transformed file is benign or the transformed file is malware.

In one embodiment, a system for training malware classifiers may include at least one physical processor and physical memory that includes computer-executable instructions that, when executed by the physical processor, cause the physical processor to (1) perturb, at the system, a binary file in a manner that maintains functionality of the binary file, (2) classify the perturbed binary file with a first machine learning classifier to produce a classification result, (3) produce a transformed file by repeating the perturbing and classifying steps until the transformed file becomes misclassified, and (4) perform a security action comprising training a second machine learning classifier with the transformed file and an associated correct classification result.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) perturb, at the system, a binary file in a manner that maintains functionality of the binary file, (2) classify the perturbed binary file with a first machine learning classifier to produce a classification result, (3) produce a transformed file by repeating the perturbing and classifying steps until the transformed file becomes misclassified, and (4) perform a security action comprising training a second machine learning classifier with the transformed file and an associated correct classification result.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
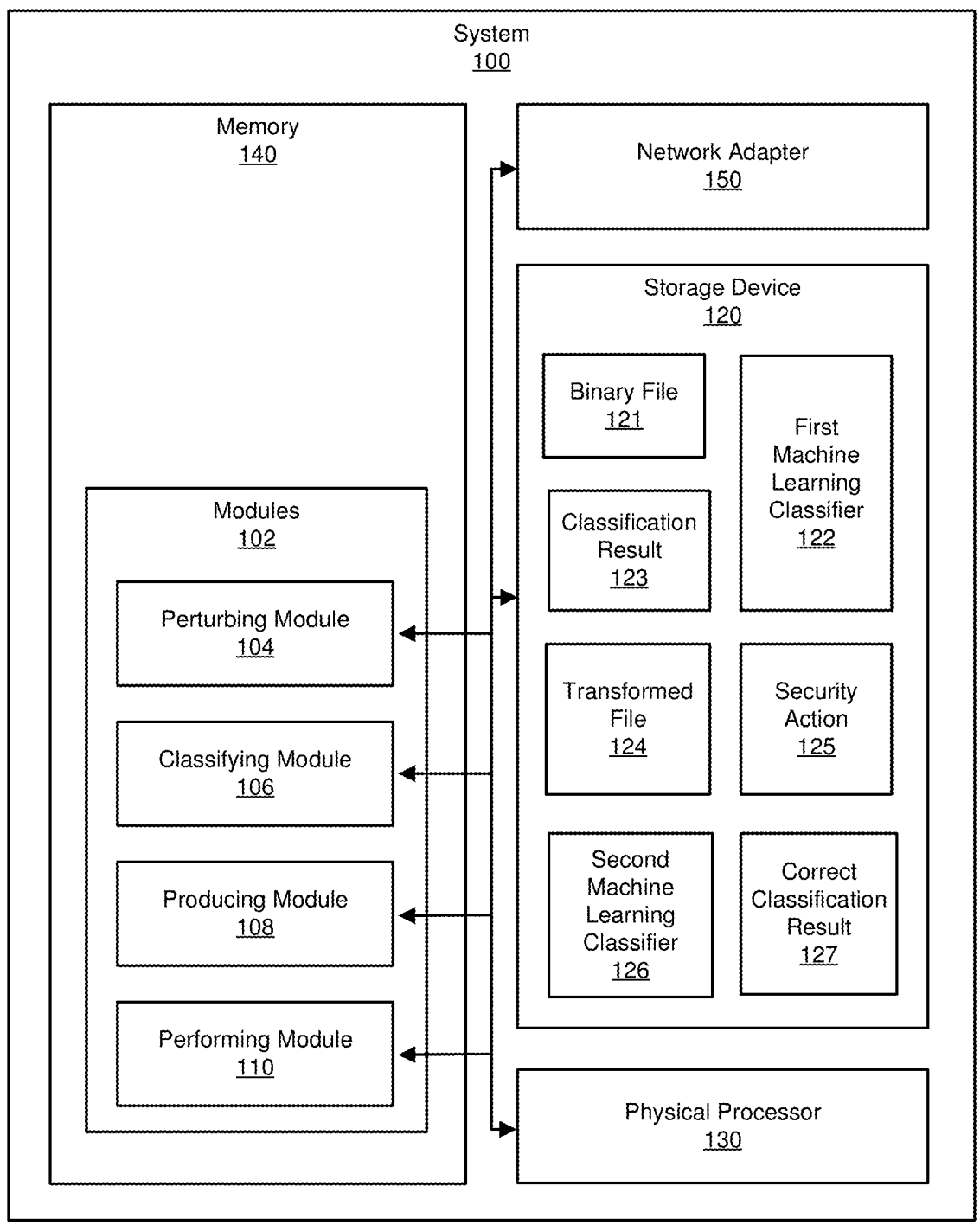
FIG. 1 is a block diagram of an example system for training malware classifiers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for training malware classifiers. As will be explained in greater detail herein, the disclosed systems and methods may automatically perform techniques that detect, classify, prevent, stop, and/or mitigate effects of malware executing within computing systems.

Attackers may use malware that escapes detection by taking advantage of inherent vulnerabilities of anti-malware machine learning classifiers. When combating this form of malware, it is noteworthy that these malicious files are restricted by nontrivial needs to provide the same functionality as benign binary files to evade detection by performance failures. Further, source code of malware samples may not be available for inclusion in training sets for machine learning classifiers. Also, it may be difficult to verify if the malware files behave similarly to the benign binary files. Thus, provided are techniques that may address these issues by generating adversarial samples from binary files which may be used to train machine learning anti-malware classifiers and to detect, classify, prevent, stop, and/or mitigate effects of malware.

In some embodiments, the provided techniques may provide improved end-to-end neural networks for detecting malware from binary files. These neural networks may learn representations from training sets and leverage these representations to discriminate between malicious files and benign files. In some examples, the provided techniques may generate adversarial examples to bypass these classifiers by in-place binary code randomization and/or generic programming techniques.

In some examples, the provided techniques intentionally perturb (i.e., alter) binary files in manners that maintain functionality while causing anti-malware machine learning classifiers to misclassify the perturbed binary files. The binary files, prior to perturbing, may be benign or malicious. In some examples, the binary files may be perturbed by code randomizations, crossover operations, mutation operations, or combinations thereof. In some examples, perturbations that maintain functionality of the binary files may include techniques such as reordering instructions in the binary files, removing instructions from the binary files, changing instructions in the binary files to functionally-equivalent instructions, the like, or combinations thereof. Instruction changes may be within a group of functionally-equivalent instructions to maintain functionality of the binary files. In some embodiments, iterative techniques may be used to produce different perturbations of the binary files and then test malware-detecting machine learning classifiers with the different perturbations of the binary files. Iterative perturbation and testing may continue until the perturbed files are misclassified by the malware-detecting machine learning classifiers.

After the perturbed files are misclassified, machine learning classifiers may be trained with both the perturbed files and correct associated classification results to eliminate vulnerabilities of the machine learning classifiers and increase accuracy of the machine learning classifiers.

By doing so, the systems and methods described herein may improve computing devices. Examples of computing devices in which the provided techniques may be implemented include, and are not limited to, computer server devices, laptop computers, tablet computers, desktop computers, wearable computing devices (e.g., smart watches, smart glasses), smartphone devices, identify verification devices, access control devices, and/or smart televisions. In some examples, the provided techniques may advantageously increase the accuracy of malware-detecting classifiers on computing devices. Further, the provided techniques may advantageously improve the accuracy of malware determinations (e.g., reduce false positive determinations and/or reduce false negative determinations). Further, the provided techniques may advantageously mitigate and/or eliminate vulnerabilities of machine learning classifiers. Also, the systems and methods described herein may beneficially improve anti-malware services and/or software.

Figure 2:
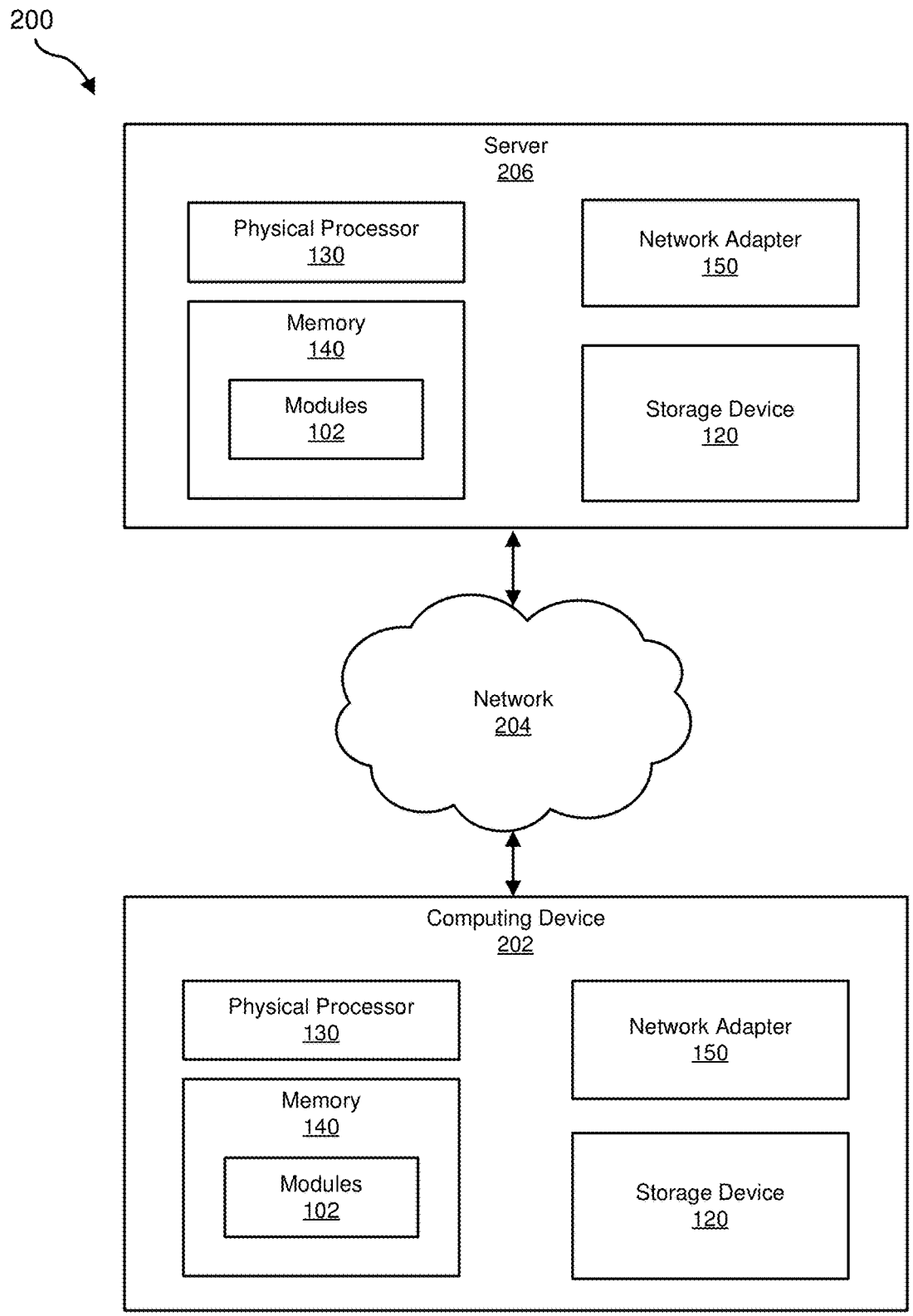
FIG. 2 is a block diagram of an additional example system for training malware classifiers.
Figure 3:
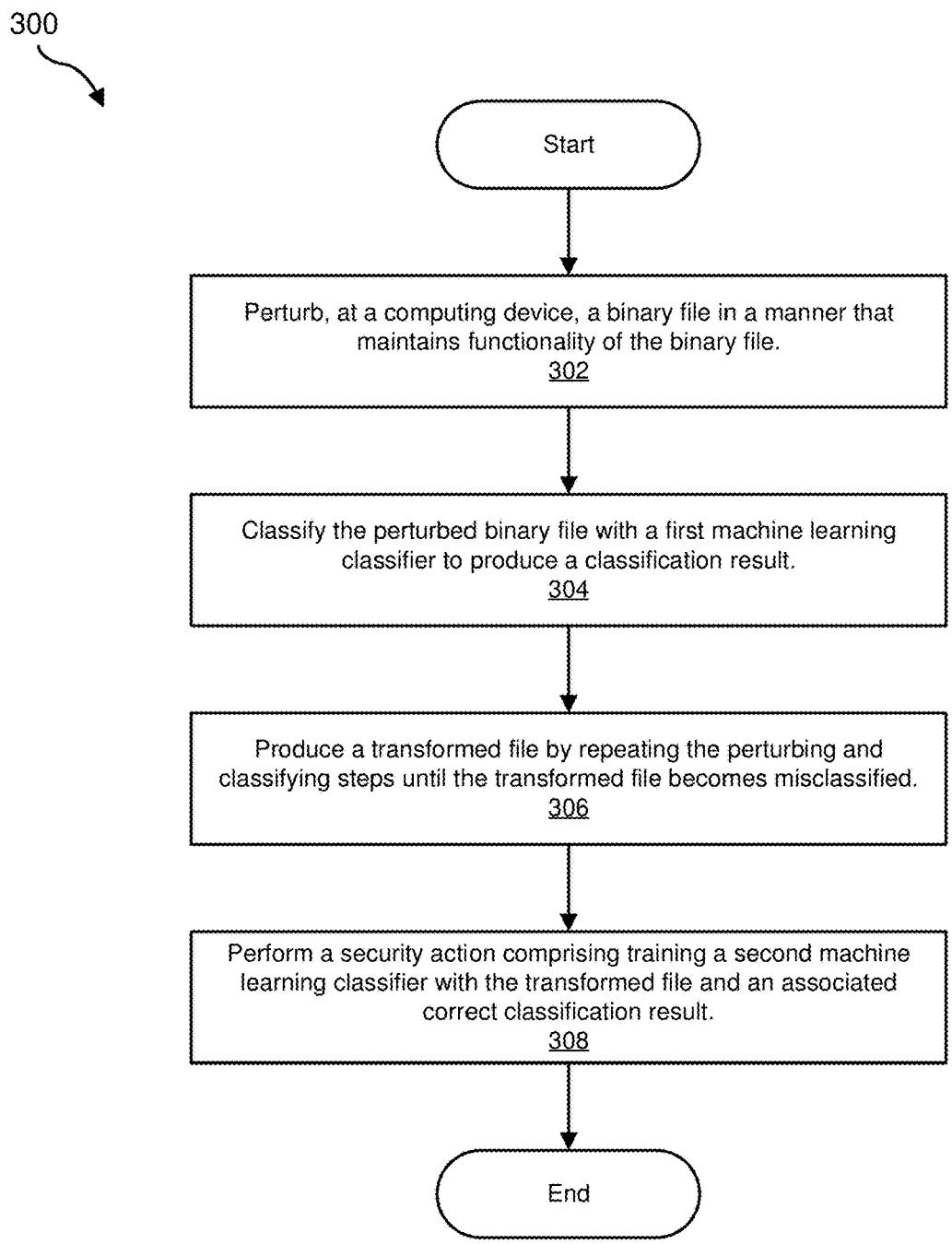
FIG. 3 is a flow diagram of an example method for training malware classifiers.
Figure 4:
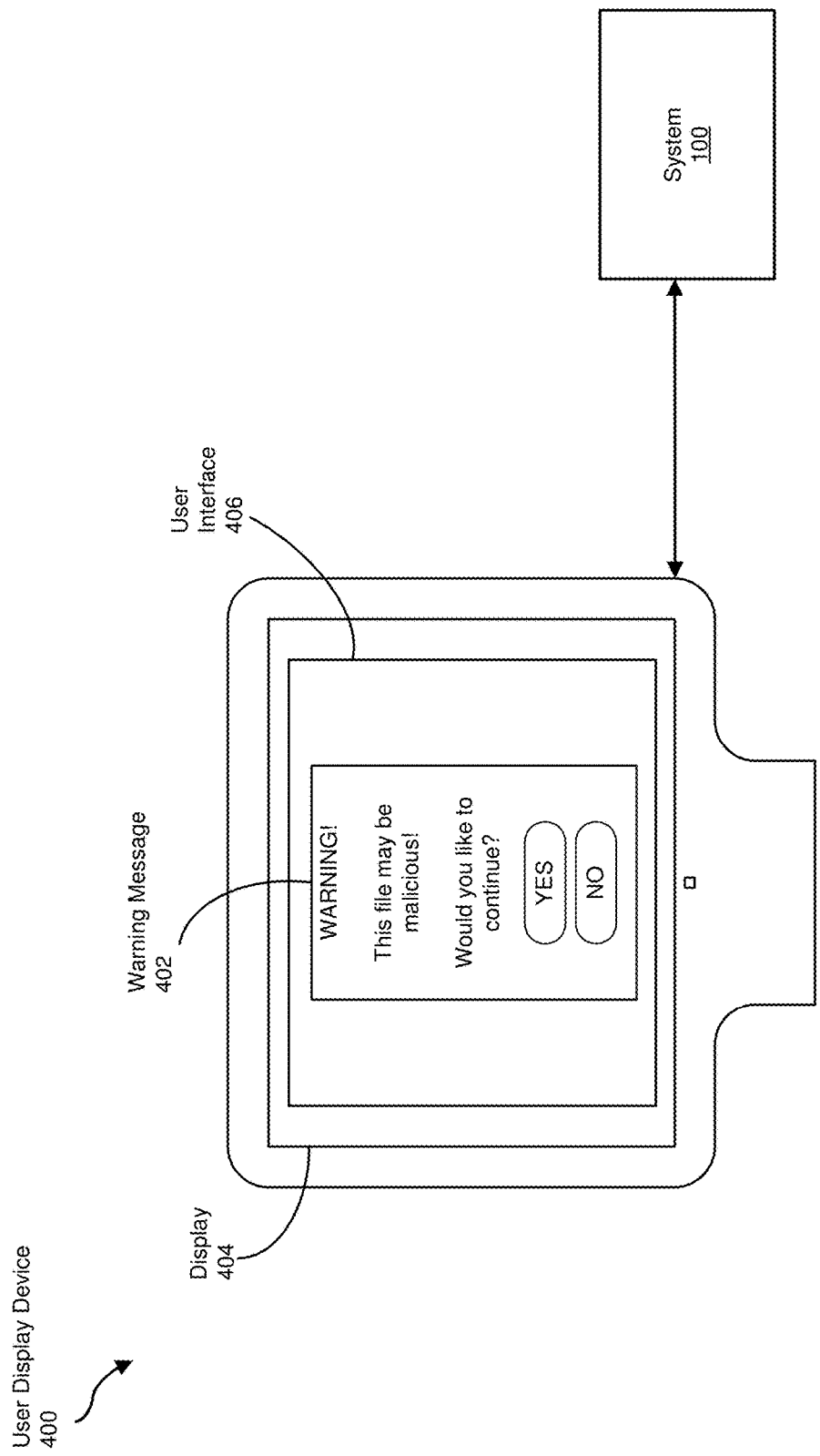
FIG. 4 is a block diagram of an example warning message on a user display device.

The following will provide, with reference to FIGS. 1-2 and 4, detailed descriptions of example systems for training malware classifiers. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for training malware classifiers. As illustrated in this figure, example system 100 may include one or more modules 102 for performing one or more tasks. As will be explained in greater detail below, modules 102 may include a perturbing module 104, a classifying module 106, a producing module 108, and a performing module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In some examples, storage device 120 may store, load, and/or maintain information indicating one or more of binary file 121, first machine learning classifier 122, classification result 123, transformed file 124, security action 125, second machine learning classifier 126, and/or correct classification result 127. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate training malware classifiers. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 150. In some examples, network adapter 150 may be a physical network adapter connected to a physical network (e.g., network 204 in FIG. 2). In some examples, network adapter 150 may be a virtual network adapter that passes packets between software components inside system 100.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to train malware classifiers. For example, and as will be described in greater detail below, one or more of modules 102 may cause computing device 202 and/or server 206 to (1) perturb, at computing device 202 and/or server 206, binary file 121 in a manner that maintains functionality of binary file 121, (2) classify, at computing device 202 and/or server 206, the perturbed binary file 121 with first machine learning classifier 122 to produce classification result 123, (3) produce, at computing device 202 and/or server 206, transformed file 124 by repeating the perturbing and classifying steps until transformed file 124 becomes misclassified in classification result 123, and (4) perform, at computing device 202 and/or server 206, security action 125 comprising training second machine learning classifier 126 with transformed file 124 and associated correct classification result 127.

Computing device 202 generally represents any type or form of computing device capable of reading computer-executable instructions. In some examples, computing device 202 may represent a computer running anti-malware software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, computing server 206 may represent a computer running anti-malware software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

FIG. 3 is a flow diagram of an example computer-implemented method 300 for training malware classifiers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may perturb binary files in a manner that maintains functionality of the binary files. The systems described herein may perform step 302 in a variety of ways. For example, perturbing module 104 may, as part of computing device 202 and/or server 206 in FIG. 2, perturb binary file 121 in a manner that maintains functionality of binary file 121.

In some examples, binary files, prior to perturbing, may be benign or malicious.

In some examples, the binary files may be disassembled to provide instruction-level representations of the binary files. In some embodiments, equivalent instructions that may be equivalent to instructions in the instruction-level representations of the binary files may be identified as candidates with which to perturb the binary files. The equivalent instructions may be used to perturb (i.e., transform, alter) the binary files while maintaining functionality of the binary files. As a non-limiting example, if an unaltered binary file includes instructions to "pick up the dog and pick up the cat," these instructions may be reordered to form a perturbed binary file including functionally equivalent instructions of "pick up the cat and pick up the dog." After identifying candidate equivalent instructions, the provided techniques may substitute varied combinations of equivalent instructions to create perturbed binary files. In some examples, the substitution may be iterative and/or random. The perturbed binary files may be functionally equivalent because the perturbed binary files may be created with equivalent instructions.

In some embodiments, method 300 may include (1) iteratively changing functionally-equivalent instructions in the binary files during each repetition of perturbing and (2) retaining instruction changes that produce correct classification results having low decision confidence and re-perturbing binary files with the retained instruction changes. In some examples, perturbing may include (1) reordering instructions in the binary files, (2) removing instructions from the binary files, (3) changing instructions in the binary files to functionally-equivalent instructions, (4) reordering register-preservation pushes, (5) swapping registers, or (6) combinations thereof. In an embodiment, perturbing may include transformations of binary files in manners that maintain functionality of the binary files.

As illustrated in FIG. 3, at step 304 one or more of the systems described herein may classify the perturbed binary files with first machine learning classifiers to produce classification results. The systems described herein may perform step 304 in a variety of ways. For example, classifying module 106 may, as part of computing device 202 and/or server 206 in FIG. 2, classify a perturbed version of binary file 121 with first machine learning classifier 122 to produce classification result 123.

As illustrated in FIG. 3, at step 306 one or more of the systems described herein may produce transformed files by repeating the perturbing and classifying steps until the transformed file becomes misclassified. The systems described herein may perform step 306 in a variety of ways. For example, producing module 108 may, as part of computing device 202 and/or server 206 in FIG. 2, produce transformed file 124 by repeating steps 304 and 306 until transformed file 124 becomes misclassified in classification result 123.

In some embodiments, misclassification of the transformed file may indicate (1) the transformed files are benign (e.g., when the transformed files are malware) or (2) the transformed files are malware (e.g., when the transformed files are benign).

As illustrated in FIG. 3, at step 308 one or more of the systems described herein may perform security actions comprising training second machine learning classifiers with the transformed files and associated correct classification results. The systems described herein may perform step 308 in a variety of ways. For example, performing module 110 may, as part of computing device 202 and/or server 206 in FIG. 2, perform security action 125 comprising training second machine learning classifier 126 with transformed file 124 and associated correct classification result 127. In some examples, transformed files may be stored in storage devices (e.g., storage device 120).

In some examples, step 308 includes training second machine learning classifiers with the transformed files and associated correct classification results, thus training the second machine learning classifiers as advanced anti-malware machine learning classifiers. The training may be actions that improve abilities of the second machine learning classifiers to provide security for computing devices by enhancing the second machine learning classifiers' abilities to perform nuanced malware detecting and thus protect against unknown viruses that use modified code to avoid detection by machine learning classifiers while binary files infected by the viruses otherwise function normally. Thus, step 308 may be a proactive security action for detecting unknown and very evasive malware.

In some embodiments, servers may send the transformed files and associated correct classification results to client computing devices and step 308 may be performed by the client computing devices.

In some embodiments, servers may perform step 308 and send the trained second machine learning classifiers to client computing devices for implementation in anti-malware operations.

In an example, method 300 may include classifying second binary files with the trained second machine learning classifiers (e.g., at client computing devices) to produce respective classification results for the second binary files. In an example, method 300 may include performing second security actions in response to the respective classification results for the second binary files. In some examples, the second security actions may include blocking access by second binary files to the computing device, another computing device, or both.

In some embodiments, security actions may attempt to identify and/or ameliorate potential security risks posed by malicious processes. In some examples, security actions may include blocking access to devices (e.g., storage devices, memories, network devices, etc.), allowing limited access to devices, allowing read-only access to devices, encrypting information, and/or other acts limiting access to devices. In some examples, security actions may be performed automatically. In some embodiments, security actions may be performed based on a level of sensitivity of information that processes may attempt to access. In additional examples, the security actions may include displaying, on user displays (e.g., display 404), warnings indicating that processes may be at least potentially malicious.

As detailed above, the steps outlined in method 300 in FIG. 3 may produce training sets for malware-detecting machine learning classifiers. By doing so, in some examples, the systems and methods described herein may improve accuracy of malware-detecting classifiers on computing devices. Further, the provided techniques may improve accuracy of malware determinations and/or eliminate vulnerabilities of the machine learning classifiers.

In some examples, security actions may include displaying, on user displays, warnings indicating that files may be potentially malicious. FIG. 4 depicts an example of a user display device 400 including display 404 which may present user interface 406. In this non-limiting example, user display device 400 may display warning message 402 as at least a part of a security action (e.g., security action 125) in response to identifying a file as malicious.

Figure 5:
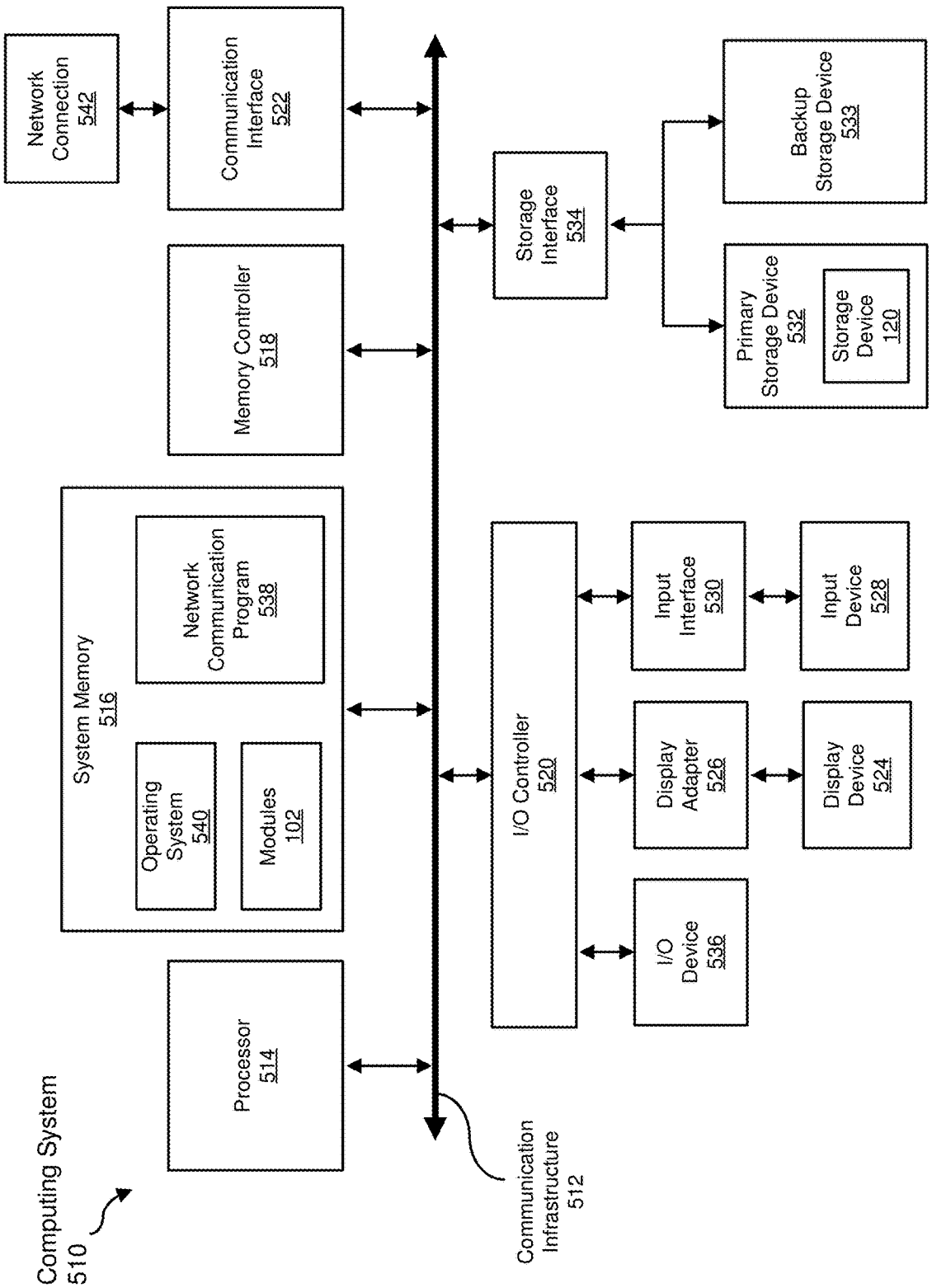
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be at least a part of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
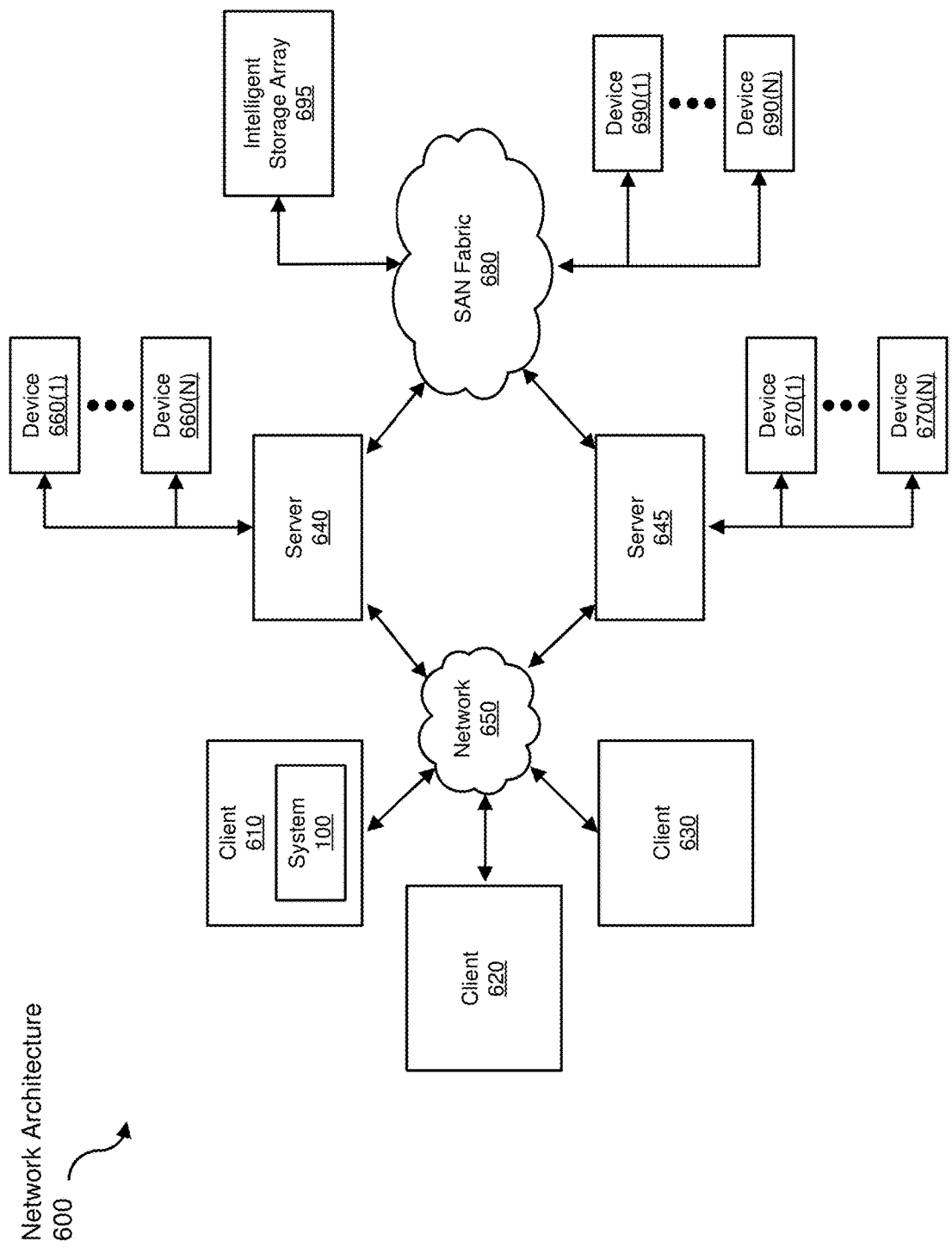
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for training malware classifiers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive binary files to be transformed, transform the binary files, output a result of the transformation to a user display device, use the result of the transformation to initiate a security action, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for training malware classifiers, at least a portion of the method being performed by a computing device comprising at least one processor, the method comprising:
    classifying, at the computing device, a binary file as benign;
    perturbing, at the computing device, the binary file in a manner that maintains functionality of the binary file;
    classifying, at the computing device, the perturbed binary file with a first machine learning classifier to produce a classification result;
    producing, at the computing device, a transformed file by repeating the perturbing and classifying steps until the transformed file becomes classified as malware, the repeated perturbing and classifying comprising:
        identifying at least one functionally equivalent instruction for at least one instruction included in an instruction-level representation of the binary file;
        iteratively changing instructions in the binary file by substituting the at least one functionally equivalent instruction for the at least one instruction in the instruction-level representation of the binary file; and
        retaining at least a subset of the instruction changes that produce the classification result; and
    performing a security action comprising training a second machine learning classifier with the transformed file and an associated classification result.

2. The computer-implemented method of claim 1, further comprising:
    classifying a second binary file with the trained second machine learning classifier to produce a respective classification result for the second binary file; and
    performing a second security action in response to the respective classification result for the second binary file.

3. The computer-implemented method of claim 2, wherein the second security action further comprises blocking access by the second binary file to the computing device, another computing device, or both.

4. The computer-implemented method of claim 1, wherein the repeated perturbing and classifying further comprises reordering instructions included in the instruction-level representation of the binary file.

5. The computer-implemented method of claim 1, wherein the repeated perturbing and classifying further comprises removing an instruction from the instruction-level representation of the binary file.

6. A system for training malware classifiers, the system comprising:
    at least one physical processor; and
    physical memory comprising computer-executable instructions that, when executed by the physical processor, cause the physical processor to:
        classify, at the system, a binary file as benign;
        perturb, at the system, the binary file in a manner that maintains functionality of the binary file;

classify the perturbed binary file with a first machine learning classifier to produce a classification result;

produce a transformed file by repeating the perturbing and classifying steps until the transformed file becomes classified as malware, the repeated perturbing and classifying comprising:

identifying at least one functionally equivalent instruction for at least one instruction included in an instruction-level representation of the binary file;

iteratively changing instructions in the binary file by substituting the at least one functionally equivalent instruction for the at least one instruction in the instruction-level representation of the binary file; and retaining at least a subset of the instruction changes that produce the classification result; and perform a security action comprising training a second machine learning classifier with the transformed file and an associated classification result.

7. The system of claim 6, wherein the repeated perturbing and classifying further comprises reordering instructions included in the instruction-level representation of the binary file.

8. The system of claim 6, wherein the repeated perturbing and classifying further comprises removing an instruction from the instruction-level representation of the binary file.

9. The system of claim 6, wherein the computer-executable instructions further include computer-executable instructions that, when executed by the physical processor, cause the physical processor to:

classify a second binary file with the trained second machine learning classifier to produce a respective classification result for the second binary file; and perform a second security action in response to the respective classification result for the second binary file.

10. A non-transitory computer-readable medium comprising one or more computer-executable instructions that, when executed by at least one processor of a computing device, cause the computing device to:

classify, at the computing device, a binary file as benign;

perturb, at the computing device, the binary file in a manner that maintains functionality of the binary file;

classify the perturbed binary file with a first machine learning classifier to produce a classification result;

produce a transformed file by repeating the perturbing and classifying steps until the transformed file becomes classified as malware, the repeated perturbing and classifying comprising:

identifying at least one functionally equivalent instruction for at least one instruction included in an instruction-level representation of the binary file;

iteratively changing instructions in the binary file by substituting the at least one functionally equivalent instruction for the at least one instruction in the instruction-level representation of the binary file; and retaining at least a subset of the instruction changes that produce the classification result; and perform a security action comprising training a second machine learning classifier with the transformed file and an associated classification result.

11. The non-transitory computer-readable medium of claim 10, wherein the repeated perturbing and classifying further comprises reordering instructions included in the instruction-level representation of the binary file.

12. The non-transitory computer-readable medium of claim 10, wherein the repeated perturbing and classifying further comprises removing an instruction from the instruction-level representation of the binary file.

13. The non-transitory computer-readable medium of claim 10, wherein training a second machine learning classifier with the transformed file and an associated classification result comprises training the second machine learning classifier with the transformed file and a classification of the transformed file indicating the transformed file is benign.

14. The system of claim 6, wherein training a second machine learning classifier with the transformed file and an associated classification result comprises training the second machine learning classifier with the transformed file and a classification of the transformed file indicating the transformed file is benign.

15. The computer-implemented method of claim 1, training a second machine learning classifier with the transformed file and an associated classification result comprises training the second machine learning classifier with the transformed file and a classification of the transformed file indicating the transformed file is benign.

16. The non-transitory computer-readable medium of claim 10, wherein the one or more computer-executable instructions, when executed by the at least one processor, further cause the computing device to:

classify a second binary file with the trained second machine learning classifier to produce a respective classification result for the second binary file; and perform a second security action in response to the respective classification result for the second binary file.

17. The computer-implemented method of claim 1, wherein the repeated perturbing and classifying further comprises re-ordering register-preservation pushes.

18. The computer-implemented method of claim 1, wherein the repeated perturbing and classifying further comprises swapping registers.

19. The system of claim 6, wherein the repeated perturbing and classifying further comprises at least one of re-ordering register-preservation pushes or swapping registers.

20. The non-transitory computer-readable medium of claim 10, wherein the repeated perturbing and classifying further comprises at least one of re-ordering register-preservation pushes or swapping registers.

* * * * *